Oct. 21, 1952 E. A. ARP 2,614,442
MACHINE FOR BORING CONNECTING RODS
Filed Sept. 13, 1950 4 Sheets-Sheet 1

INVENTOR.
EWALD A. ARP
BY
J. H. Braddock
ATTORNEY.

Oct. 21, 1952        E. A. ARP        2,614,442
MACHINE FOR BORING CONNECTING RODS
Filed Sept. 13, 1950        4 Sheets-Sheet 2
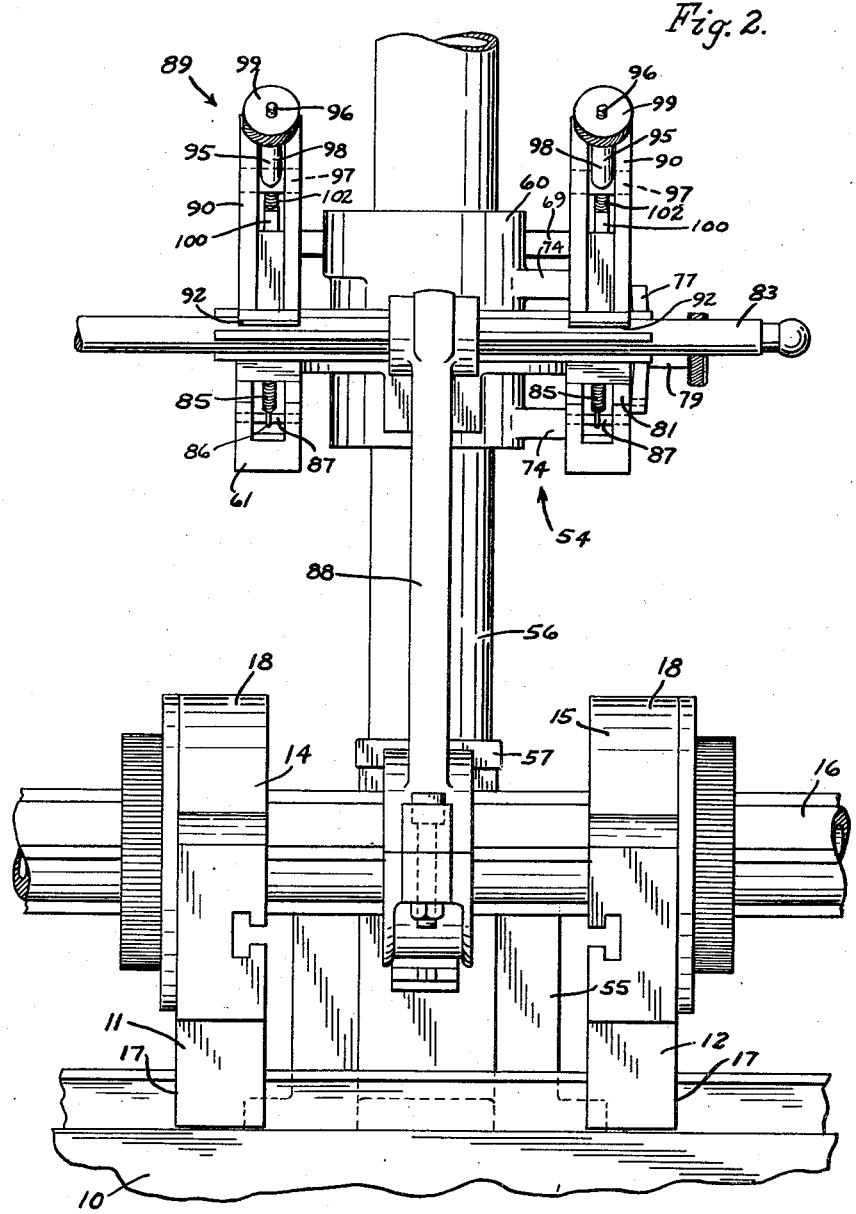
INVENTOR.
EWALD A. ARP
BY
J. H. Braddock
ATTORNEY.

Oct. 21, 1952  E. A. ARP  2,614,442
MACHINE FOR BORING CONNECTING RODS
Filed Sept. 13, 1950  4 Sheets-Sheet 3
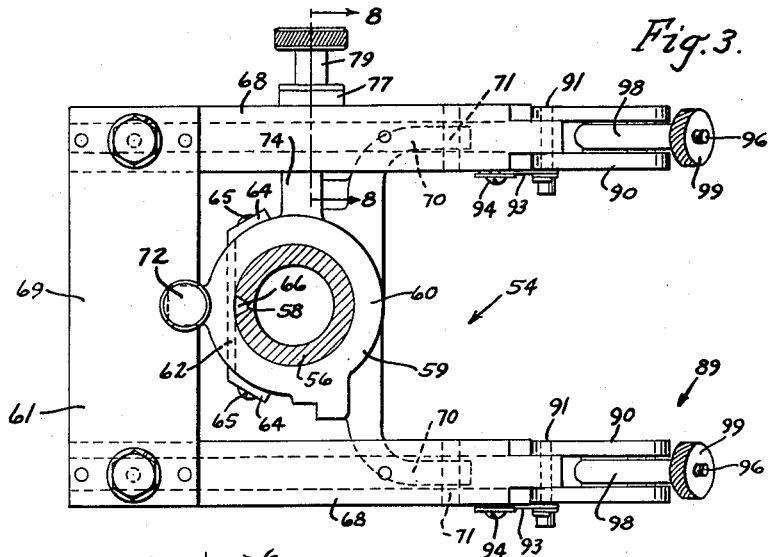
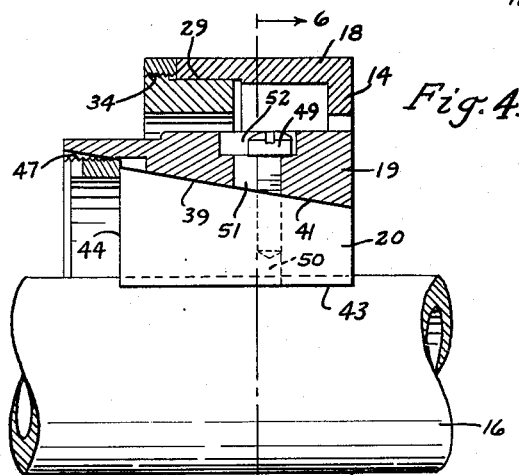
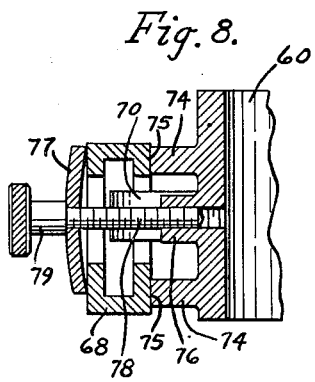
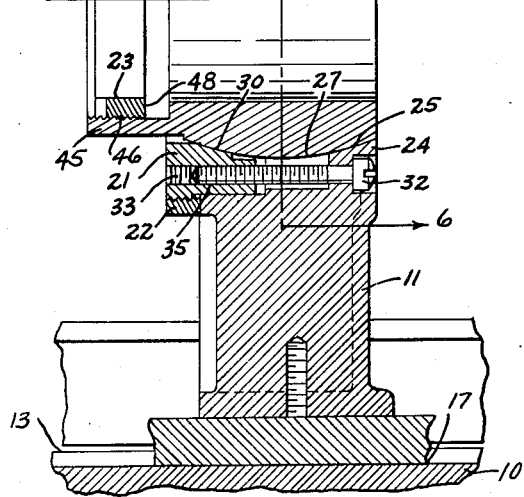
INVENTOR.
EWALD A. ARP
BY
J. H. Braddock
ATTORNEY.

Oct. 21, 1952  E. A. ARP  2,614,442
MACHINE FOR BORING CONNECTING RODS
Filed Sept. 13, 1950  4 Sheets-Sheet 4

INVENTOR.
EWALD A. ARP
BY
B. H. Braddock
ATTORNEY

Patented Oct. 21, 1952

2,614,442

UNITED STATES PATENT OFFICE 2,614,442

MACHINE FOR BORING CONNECTING RODS

Ewald A. Arp, Minneapolis, Minn., assignor to Tobin-Arp Manufacturing Company, Minneapolis, Minn., a corporation of Minnesota Application September 13, 1950, Serial No. 184,636

16 Claims. (Cl. 77—62)

This application is a continuation in part of my pending applications Serial No. 44,442, for Self Alining Bearing, filed August 16, 1948, and Serial No. 63,691, for Machine for Boring Connecting Rods, filed December 6, 1948, now Patent No. 2,573,532, issued October 30, 1951, and presents additional novel and improved features and characteristics.

The invention herein has relation to a machine which has been devised to be especially useful for boring the bearings of connecting rods for crank shafts and wrist pins.

In the accompanying drawings forming a part of this specification,

Fig. 2 is an end elevation of the machine as it would appear from the right in Fig. 1;

Fig. 3 is a horizontal sectional view, taken on line 3—3 in Fig. 1, parts being omitted;

Fig. 4 is a detail sectional view of a self alining bearing of the machine, taken on line 4—4 in Fig. 1;

Fig. 8 is a detail sectional view, taken on line 8—8 in Fig. 3; and

Fig. 9 is an elevational view detailing a replaceable supporting element of the machine.

Figure 1:
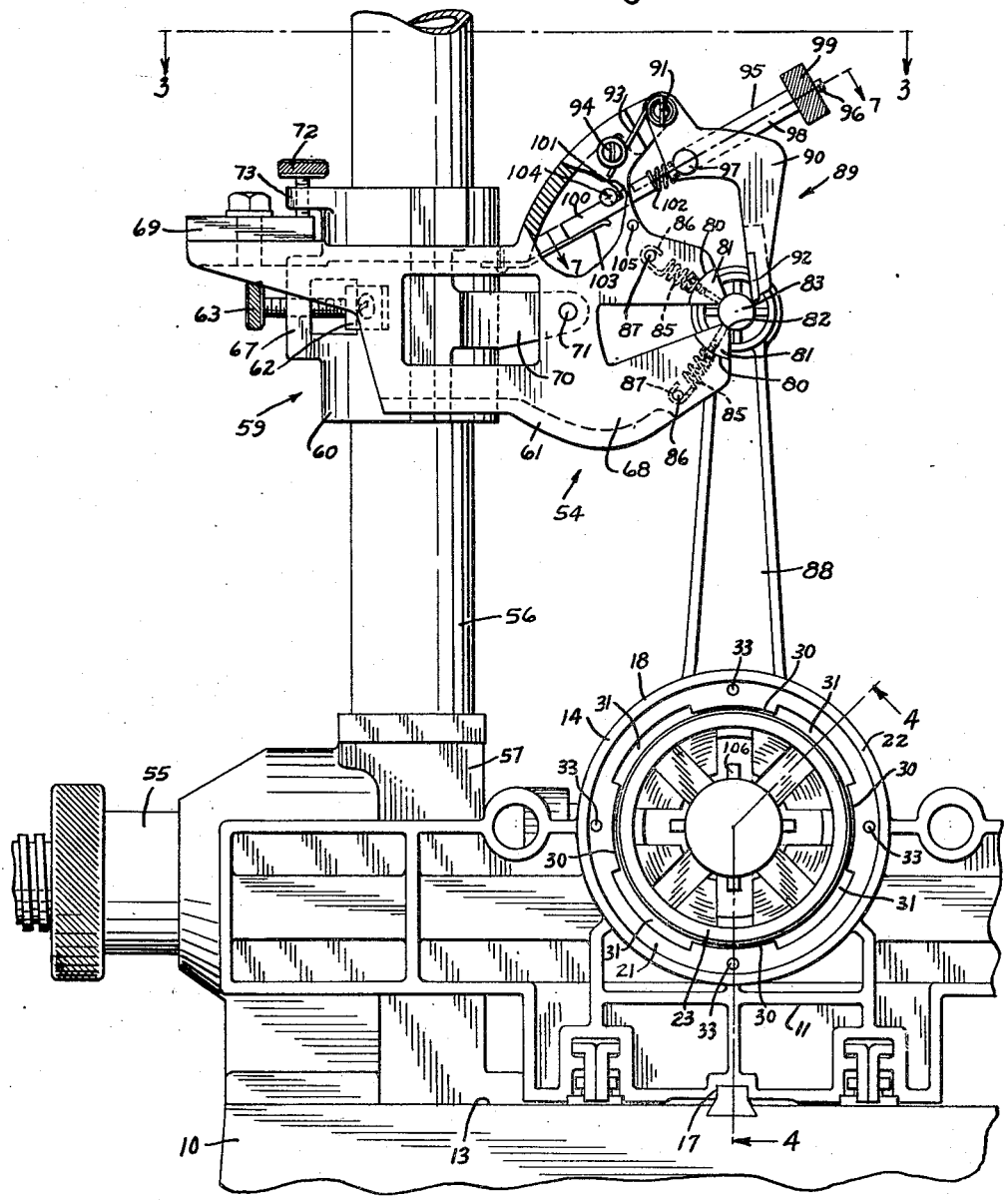
Fig. 1 is a side elevational view, partially in section and partially broken away, of a machine made according to the invention.
Figure 7:
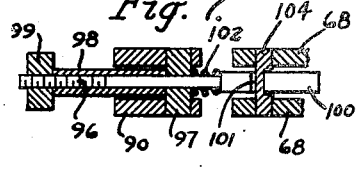
Fig. 7 is a detail sectional view, taken on line 7—7 in Fig. 1.

A frame 10 of the machine is constituted as a rectilinear slab of rigid material, and can be supported in any suitable and convenient manner, as a part of a table, for example, desirably so that the rectilinear slab will be horizontally disposed.

Spaced apart, parallel boring bar supporting units, indicated 11 and 12, respectively, are situated upon a flat upper surface 13 of the frame 10 for slidably adjustable movement toward and away from each other, and said supporting units include self-alining bearings, represented 14 and 15, respectively, adapted to be situated in alined relation in a single, desirably horizontal, plane to be capable of selectively receiving a boring bar with cutting tool, or a locating rod or mandrel 16. The supporting units 11 and 12 are keyed to the frame 10, as at 17, for slight rocking movement in a horizontal plane.

The self-alining bearings 14 and 15 are duplicates. Each includes a stationary housing 18 constituted as a part of the corresponding boring bar supporting unit, a cage 19 within the stationary housing 18, a plurality of blocks, four as disclosed, each denoted 20, within the cage, a retainer ring 21 for the cage, a lock nut 22 for the retainer ring, and a take-up ring 23 for the blocks 20.

The housing 18 of each self-alining bearing is constituted as an annular member open at one of its ends, its left end as shown in Fig. 4 of the drawings, and provided at its opposite end with an interiorly extending annular flange 24. The annular flange 24 provides spaced apart, interiorly facing, arc shape bearing surfaces, four as shown, each represented 25, spaced 90 degrees apart, and said annular flange is cut away, as indicated at 26, at locations between adjacent arc shape bearing surfaces 25. There are arc shape bearing surfaces 25 diametrically opposite each other, and also cut-out portions 26 diametrically opposite each other. The arc shape bearing surfaces 25 are all in a single spherical surface and in a single plane in direction transversely of the longitudinal axis of the stationary housing 18.

The cage 19 is constituted as a hollowed out part-spherical member having externally facing arc shape bearing surfaces, four as shown, each designated 27, spaced at 90 degrees apart, and the external surface of said cage is cut away, as at 28, at locations between adjacent arc shape bearing surfaces 27. There is an arc shape bearing surface 27 engaged with each of the arc shape bearing surfaces 25, and said arc shape bearing surfaces 27 are all in a single spherical surface which is in fact the same spherical surface as that in which the arc shape bearing surfaces 25 are situated.

The retainer ring 21 for the cage 19 of each self-alining bearing is constituted as an annular element within an annular space of the self-alining bearing between a portion of the housing 18 at and adjacent to its open end and an external portion of said cage in spaced relation to the interiorly extending annular flange 24. Stated otherwise, said retainer ring 21 and internally extending annular flange 24 are in alined relation in the direction of the longitudinal axis of the cage 19. An external surface 29 of the retainer ring at an inner part thereof is of cylindrical configuration to be snugly slidable inwardly and outwardly along an internal cylindrical surface of the housing 18 at and adjacent to its open end, and an internal surface of said retainer ring provides arc shape bearing surfaces 30. There is an arc shape bearing surface 30 engaged with each of the arc shape bearing surfaces 27, and said retainer ring 21 is cut away, as indicated at 31, at locations between adjacent arc shape bearing surfaces 30. Said arc shape bearing surfaces 30 are all in a single spherical plane which is in fact the same spherical surface as that in which the arc shape bearing surfaces 25 and 27 are situated.

Screw bolts 32, extending through and having their heads countersunk in the interiorly extending annular flange 24 and engaged in interiorly threaded openings 33 extending through the retainer ring 21, are for adjusting said retainer ring inwardly and outwardly, toward and away from said interiorly extending annular flange, and for maintaining the retainer ring in position to cause the arc shape bearing surfaces 25, 27 and 30, 27, respectively, to be in engaged relation. There are four screw bolts 32 in the disclosure as made, and said screw bolts are in alined relation to and equally spaced from the longitudinal axis of the cage 19.

The outer end portion of the retainer ring 21 includes an external thread 34, and the lock nut 22 has an internal thread 35 adapted to be turned down upon said external thread 34 until said lock nut is engaged against the open, adjacent end of the housing 18 to cause the retainer ring 21 to be secured against the possibility of turning movement. The lock nut 22 will be situated loosely on the retainer ring 21 until said retainer ring is adjusted to its intended and proper position, and after adjustment of said retainer ring is accomplished, said lock nut will be turned down against the housing 18.

The interiorly extending annular flange 24 and the retainer ring 21 will, in cooperation with each other, maintain the cage 19 in the housing 18 against the possibility of displacement of said cage from said housing, and it will be apparent that the cage 19 is mounted in the housing 18 to be capable of rocking in any direction, by reason of the engagement of the arc shape bearing surfaces 27 with the arc shape bearing surfaces 25 and 30.

The hollowed out part-spherical member or cage 19 is constructed at its interior to provide rectilinear slots, four as shown, each denoted 36, extending longitudinally of said hollowed out part-spherical member or cage, and there is a block 20 within each of said longitudinally extending slots 36. The blocks 20 are bearing elements of each self alining bearing, and the longitudinally extending slots 36 are disposed at ninety degrees apart, there being longitudinally extending slots 36, 36 disposed diametrically opposite each other in direction transversely of each hollowed out part-spherical member or cage 19. The longitudinally extending slots 36 are contiguous with a central passageway 37 through the hollowed out part-spherical member or cage 19 for freely receiving a shaft, such as the locating rod or mandrel 16, or a boring bar, to be supported in the oppositely disposed self-alining bearings, and each longitudinally extending slot 36 is disposed radially of the longitudinal axis of the corresponding hollowed out part-spherical member or cage.

The longitudinally extending, radially disposed rectilinear slots 36 in the cage of each self alining bearing are all of the same size and configuration or construction. Each is bounded at its base or exterior by a flat camming surface 39 which is disposed in oblique relation to the longitudinal axis of the corresponding cage and extends exteriorly of said cage in direction from the corresponding internally extending annular flange 24 toward the corresponding retainer ring 21, and at its opposite sides by spaced, parallel surfaces 40, 40 which are disposed radially of said corresponding cage. Also, each flat camming surface 39 lies in a plane which is perpendicular to the planes including the spaced apart, parallel surfaces 40, 40 bounding the corresponding rectilinear slot 36.

The blocks or bearing elements 20 of each self-alining bearing are of duplicate construction. Each block or bearing element is bounded at its exterior side by a flat camming surface 41, engaged against and slidable over the flat camming surface 39 bounding the base or exterior of the rectilinear slot 36 containing the corresponding block or bearing element, at its opposite sides by spaced apart, parallel surfaces 42, 42 engaged against and slidable over the spaced apart, parallel surfaces 40, 40 bounding the opposite sides of the corresponding rectilinear slot, and at its interior side by a part-cylindrical bearing surface 43 disposed longitudinally of the cage 19 and adapted to be engaged against a shaft, such as the locating rod or mandrel 16, or a boring bar, when disposed in the self-alining bearings. The construction and arrangement are such that the blocks or bearing elements 20 can be adjusted along the rectilinear slots 36 in one direction, toward the right in Fig. 4, to cause the part-cylindrical bearing surfaces 43 to be moved inwardly toward, and in opposite direction, toward the left in said Fig. 4, to cause said part-cylindrical bearing surfaces to be moved outwardly away from shafts such as 16. The part-cylindrical bearing surfaces can be made to lie in a single cylindrical surface concentric with the longitudinal axis of the cage 19 of the corresponding self-alining bearing by adjustment of the blocks or bearing elements 20 to positions where all of said blocks or bearing elements are equi-distantly spaced from said longitudinal axis of said cage. Each block or bearing element 20 tapers in direction from the retainer ring end of the corresponding self alining bearing toward the end thereof having the interiorly extending annular flange 24. The smaller end of each block or bearing element is bounded by a flat surface perpendicular to the longitudinal axis of the corresponding cage 19, as is also the adjacent end of said cage, and the larger end of each block or bearing element is bounded by a flat surface 44 perpendicular to said longitudinal axis of the corresponding cage.

Each cage 19 includes a cylindrical extension 45 at the end thereof opposite the interiorly extending annular flange 24 which is in surrounding relation to the blocks or bearing elements and projects beyond the large ends of said blocks or bearing elements at the corresponding end of each self alining bearing. The cylindrical extension 45 of each cage 19 includes an internal thread 46 which receives an external thread 47 upon the take-up ring 23 for the blocks or bearing elements 20. Each take-up ring is bounded at its inner end by an annular surface 48 disposed in a plane perpendicular to the longitudinal axis of the corresponding cage 19 and parallel and alined with and disposed outwardly of each of the flat surfaces 44. The take-up ring 23 is rotatably adjustable in the cylindrical extension 45 to cause all of the blocks or bearing elements 20 to be simultaneously forced inwardly of the corresponding cage thus to cause said blocks or bearing elements to be concurrently adjusted interiorly of said cage to equal extent. The take-up rings of course will preclude removal of the blocks or bearing elements 20 from the corresponding ends of the cages 19.

Locking screw bolts for the blocks or bearing elements 20 are each indicated 49. Each block or bearing element includes an internally threaded transverse opening 50 alined with a slot 51 contiguous with and extending radially outwardly from a rectilinear slot 36. Each radial slot 51 is of dimension substantially equal to the diameter of each internally threaded opening 50 in direction circumferentially of the corresponding cage 19 and of greater dimension in the direction of the longitudinal axis of said corresponding cage. That is each radial slot 51 is elongated in direction lengthwise of the corresponding cage 19. There is a locking screw bolt 49 for each block or bearing element 20. The locking screw bolts and extend freely through the radial slots 51, are threaded into the transverse openings 50 and have their heads disposed in concavities 52 in the external surfaces of the cages 19. The locking screw bolts when turned home obviously will fasten the blocks or bearing elements 20 in fixed relation to the cages 19. Said locking screw bolts of course will be loose during adjustment of said blocks or bearing elements by manipulation of the take-up rings 23, and after adjustment of the blocks or bearing elements is accomplished, the locking screw bolts will be turned home. Evidently, the take-up ring and locking screw bolts will in cooperation fixedly retain said blocks or bearing elements in any adjusted position to which set. Elongated radial slots such as 51 are for the obvious purpose of permitting adjustment of the blocks or bearing elements 20 longitudinally of the cages 19 while the locking screw bolts 49 are assembled with said blocks or bearing elements and loosely disposed in said elongated radial slots.

Figure 5:
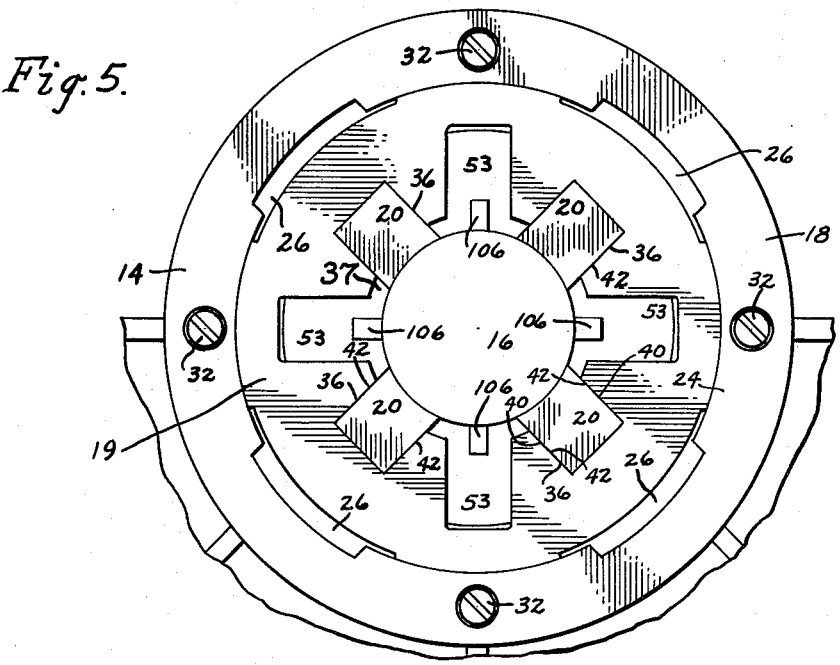
Fig. 5 is an end elevational view of the self alining bearing disclosed in Fig. 4 as it would appear from the right.
Figure 6:
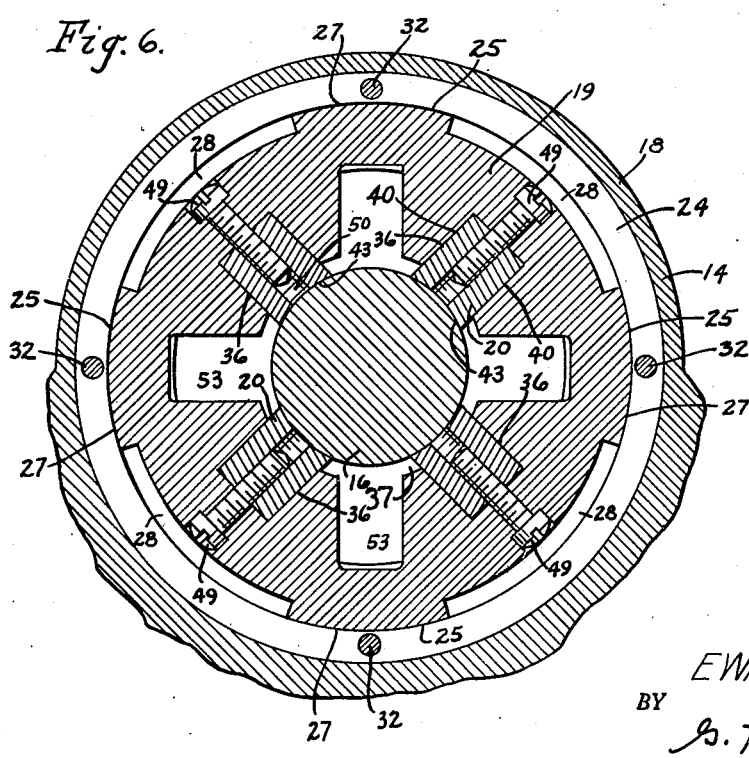
Fig. 6 is a sectional view, taken on line 6—6 in Fig. 4.

Clearance openings 53, between adjacent rectilinear slots 36 and extending longitudinally through each cage 19 in contiguous relation to its central passageway 37, are for clearance of an expanding mandrel 106, shown in Figs. 1, 2 and 5 only, upon a locating rod such as 16 to be situated in the self-alining bearings.

A locating rod or mandrel, or a boring bar, supported by the units 11 and 12 will be situated within the cage of each of self-alining alined bearings and supported by and engaged with part-cylindrical bearing surfaces such as 43 of the blocks or bearing elements 20 of each supporting unit. The cage 19 and said blocks or bearing elements of each bearing are constituted as a unitary structure when the blocks or bearing elements after adjusted are secured in the rectilinear slots 36 by the take-up ring and the locking screw bolts in the manner as above set forth. The part-spherical bearing surfaces 25 and 30 of the interiorly extending annular flange 24 and the retainer ring 21, respectively, of each bearing engage the part-spherical bearing surfaces 27 of the corresponding cage 19 at spaced apart locations so that each cage is retained within its corresponding housing 18 against the possibility of accidental displacement and can have rocking movement in any direction. Each cage 19 and the unit with which it is joined, comprised as a housing 18 and a retainer ring 21, are connected as are the united elements of a universal joint so that each cage is mounted for swinging movement in any direction thus to permit the part-cylindrical bearing surfaces 43 to become readily and easily longitudinally alined with a shaft such as 16 in any self-alining bearings made according to the principles of the invention.

The cut-away portions 26, 28 and 31 in the interiorly extending annular flange 24, the cage 19 and the retainer ring 21, respectively, of each self-alining bearing are provided to the end that each cage can be removable from and insertable in its corresponding housing while the corresponding retainer ring is in assembled position. To remove a cage it is merely necessary to rotate it ninety degrees from its operative position, and the cages can be replaced by reversal of the movement employed to remove them.

The boring bar supporting units 11 and 12 can be of duplicate construction. Each is constituted as an elongated generally rectilinear member disposed in perpendicular relation to the frame 10, as well as in perpendicular relation to a locating rod or mandrel, or a boring bar, when situated in the self-alining bearings 14 and 15. A flat lower surface of each boring bar supporting unit rests upon the flat upper surface 13 of said frame 10 for slidable movement thereover, and the boring bar supporting units are adapted to be locked down against said flat upper surface 13 in a manner forming no part of the present invention.

The machine incorporates adjustable units for supporting and clamping articles bearings of which are to be bored, an adjustable article supporting unit of said machine being represented generally at 54, and one of adjustable article clamping units of the machine being indicated generally at 55. The adjustable clamping units and the manner in which they are operative form no part of the present invention.

The adjustable article supporting unit 54 includes a vertical slide column 56 which is rigidly supported, as at 57, upon the body of the machine and extends upwardly therefrom at a side of the boring bar supporting units 11 and 12. The vertical slide column 56 has a longitudinally extending slot 58.

A holder 59, adjustable longitudinally of the vertical slide column 56 and adapted to be secured in fixed relation thereto, is constituted as a tubular element 60 slidable along said column and a supporting member 61 pivotally mounted upon the tubular element for swinging movement in a vertical plane and disposed both interiorly and exteriorly of the column. The holder 59 is adapted to be fixed on the slide column 56 at any elevation to which adjusted through the medium of a lock bar 62 and a lock screw 63. The lock bar 62 includes offset end portions 64 having openings which receive screw bolts 65 adapted to be turned into the tubular element 60 and a transverse rib 66 at its central portion disposed in the longitudinally extending slot 58, and the lock screw 63 is situated in a protuberance 67 upon said tubular element and adapted to be turned down against a surface of the lock bar 62 directly opposite its transverse rib 66. The construction and arrangement are such that the tubular element 60 will be fixed upon the vertical slide column 56 against rotational and longitudinal movement when the lock screw 63 is turned down against the lock bar 62, and also such that said tubular element can be adjusted upwardly and downwardly along said vertical slide column when said lock screw is withdrawn from said lock bar.

The supporting member 61 is constituted as a U-shape frame disposed at elevation above a locating rod or mandrel, such as 16, or a boring bar, when in the self-alining bearings 14 and 15, as well as parallel to the frame 10. Said supporting member or U-shape frame consists of spaced, parallel arms 68, 68 at opposite sides of the tubular element 60 and extending both interiorly and exteriorly therefrom and a base element 69 disposed exteriorly of said tubular element interconnecting said spaced, parallel arms. Interior end portions of the spaced, parallel arms 68, 68 provide locating rod or mandrel receiving portions of the supporting member 61 disposed interiorly of the tubular element 60 in parallel relation to and directly above the self-alining bearings 14 and 15.

The tubular element 60 integrally or rigidly supports spaced, parallel lugs 70, 70, situated at the interior side of said tubular element, as well as at opposite sides thereof, in cut-out portions of the parallel arms 68, 68, and said parallel arms are pivotally mounted, as at 71, 71, upon said parallel lugs for swinging or rocking movement of the supporting member or U-shaped frame 61 in a vertical plane. Said supporting member or U-shape frame is counterbalanced to swing downwardly by gravity at its interior side, and a vertical adjusting screw 72 in a ledge 73 rigid with and extending exteriorly from an upper portion of the tubular element 60 is adapted to be turned down against an upper surface of the base element 69 thus to limit the extent to which the interior end portion of the supporting member or U-shape frame can swing downwardly.

The tubular element 60 integrally or rigidly includes vertically spaced bosses 74, 74 with the outer ends of which interior surfaces 75, 75, between the lug 70 at the corresponding side of the supporting member or U-shape frame 61 and the base element 69, of one of the arms 68 are engaged, and mechanism is included for clamping said mentioned arm against said bosses, thus to render said tubular element and supporting member or U-shape frame a rigid structure. More explicitly stated, the tubular element integrally supports an internally threaded element 76, between the vertically spaced bosses 74, 74, an outwardly bowed leaf spring 77 is situated against an exterior surface of the arm 68 to be clamped against said tubular element, and a clamping screw includes an externally threaded body 78 extending through a hollowed out portion of said arm and turnable in said threaded element and a head 79 engaged against said outwardly bowed leaf spring. Evidently, the tubular element 60 and the supporting member or U-shape frame 61 will be made rigid with each other in response to inward turning of the clamping screw, and said supporting member or U-shape frame will be freed for swinging or rocking movement relative to said tubular element in response to outward turning of said clamping screw.

Each of the locating rod or mandrel receiving portions of the supporting member or U-shape frame 61 provides a pair of spaced, part-cylindrical engaging surfaces 80 for a locating rod or mandrel. The construction and arrangement are such that the part-cylindrical engaging surfaces 80 of the locating rod or mandrel receiving portions provided by the different arms 68 of the supporting member or U-shape frame 61 are situated in alined relation and parallel to and above a locating rod or mandrel when in the self-alining bearings 14 and 15, and all of the engaging surfaces 80 desirably can face interiorly. Stated otherwise, the part-cylindrical engaging surfaces 80 face in direction away from the tubular element 60, and, as shown, said engaging surfaces are in a vertical plane including the self-alining bearings. The parallel arms 68, 68 are, in the disclosure as made, situated inwardly of the boring bar supporting units 11 and 12. The part-cylindrical engaging surfaces 80 of each of the locating rod or mandrel receiving portions together extend through an arc approaching 180 degrees.

In Fig. 1 of the drawings, a locating rod or mandrel receiving portion there shown removably supports replaceable supporting elements 81, 81, shown in detail in Fig. 9, and said replaceable supporting elements include internal part-cylindrical engaging surfaces 82 which support a locating rod or mandrel 83. Each replaceable supporting element 81 includes an external part-cylindrical engaging surface 84 to be engaged against one of the part-cylindrical engaging surfaces 80, as well as an internal part-cylindrical engaging surface 82 to be engaged by a locating rod or mandrel. Each supporting element 81 is removably retainable in its operative position by a resilient member 85 with hook 86 to be engaged back of a pin 87 upon the corresponding arm 68. The engaging surfaces 82 are employed in Fig. 1 by reason of the fact that the locating rod or mandrel there shown is supporting the wrist pin end of a connecting rod 88. In an instance when the crank shaft end of a connecting rod is to be supported, the larger engaging surfaces 80 are to be employed.

Each of the spaced, parallel arms 68, 68 of the supporting member or U-shape frame 61 supports a locating rod or mandrel retainer 89, and said retainers are of duplicate construction. Each includes an L-lever 90 having a substantially horizontal upper arm thereof pivotally mounted, as at 91, upon an inner, upper part of the end portion of the corresponding arm 68 adjacent the end thereof opposite the tubular element 60 for swinging movement of the L-lever in the vertical plane of said corresponding arm. A substantially vertical lower arm of each L-lever 90 rigidly supports a retaining element 92 situated at the inner, lower end of the vertical arm adapted to be engaged against a surface of a locating rod or mandrel, such as 83, opposite surfaces thereof rested upon engaging surfaces such as 82 of the replaceable supporting elements 81, or 80 of the parallel arms 68, thus to retain the locating rod or mandrel in seated position.

Each L-lever 90 is resiliently urged normally to swing in direction away from the corresponding arm 68 through the instrumentality of a curled spring 93 upon the corresponding pivotal support 91 and a pin 94 rigid with said corresponding arm, and mechanism is included for releasably locking each L-lever at an inwardly swung position, against force of the corresponding curled spring 93 tending to swing the L-lever outwardly, with the corresponding retaining element 92 engaged against a locating rod or mandrel seated on engaging surfaces such as 80 or 82.

An oblique locking device 95 of each retainer 89, extending downwardly and inwardly through a cut-out portion of the horizontal upper arm of the corresponding L-lever 90, is constituted as a threaded rod 96 extending through and slidable in a transverse pin 97 rotatably mounted in said corresponding L-lever, a tubular element 98 in said cut-out portion having its inner end in proximate relation to said transverse pin 97, a knurled finger piece 99 threaded upon the upper, outer end portion of said threaded rod in proximate relation to the outer end of said tubular element, and an enlarged, elongated extension portion 100 upon the inner end of said rod and alined with the rod and tubular element having a rectilinear notch 101 in an upper surface thereof. A compression coil spring 102 upon the threaded rod 96, between the transverse pin 97 and the enlarged extension portion 100, normally resiliently urges said rod to slide inwardly, thus to retain the tubular element 98 against the transverse pin 97 and the knurled finger piece 99 against said tubular element. Each locking device 95 is supported by its transverse pin 97 for swinging movement in a vertical plane upon the corresponding arm 68.

A leaf spring 103 rigid with each arm 68 is engaged against a surface of the free end part of the enlarged extension portion 100 upon the threaded rod 96 of the corresponding locking device 95 opposite the corresponding notch 101 normally to resiliently urge said large extension portion toward a cross pin 104 rigid with said corresponding arm. The construction and arrangement will be such that when either L-lever 90 is at an inwardly swung position with the corresponding retaining element 92 engaged against a locating rod or mandrel, the corresponding cross pin 104 can be engaged in the notch 101 in the corresponding enlarged extension portion 100 by reason of resilient force exerted by the corresponding leaf spring 103. Stated otherwise, each of the locking devices 95 can be pushed downwardly and inwardly to cause the corresponding L-lever to be swung inwardly from an outward position and become locked in an inward position, where the corresponding retaining element 92 is engaged against a locating rod or mandrel, by reason of engagement of the corresponding cross pin 104 in the corresponding rectilinear notch 101, and each L-lever can be released from its inwardly swung and locked position in response to upward swinging movement of the finger piece 99 of the corresponding locking device 95, against resilient force of the corresponding leaf spring 103, thus to permit the corresponding curled spring 93 to cause the vertical arm of said L-lever and the retaining element thereon to be swung to an outward position. Stop pins 105 on the arms 68, in adjacent relation to the enlarged extension portions 100 at the lower sides thereof, are for precluding possibility of downward swinging movement of said enlarged extension portions a distance causing these to be removed from their engaged relation with the leaf springs 103.

In the instance of each retainer 89, the curled spring 93 tends to urge the corresponding L-lever to swing to its outward position where the corresponding retaining element 92 is in remote relation to its locating rod or mandrel supporting position. The locking devices 95 retain the L-levers at their inwardly swung positions where the retaining elements 92 are engaged against a locating rod or mandrel when the cross pins 104 are in the notches 101.

The obvious purpose for use of the construction and arrangement including the compression coil springs 102 is so that the retaining elements 92 can be engaged against locating rods or mandrels which vary in diameter. When a locating rod or mandrel to be engaged is of larger diameter, the knurled finger pieces 99 will be turned in direction to increase the overall lengths of the locking devices 95, and with increase in length of said locking devices the compression coil springs 102 yet will retain the tubular elements 98 against the transverse pins 97 and the knurled finger pieces 99 against said tubular elements. When a locating rod or mandrel to be engaged is of smaller diameter, the knurled finger pieces 99 will be turned in direction to decrease the overall lengths of the locking devices 95, and with decrease in length of said locking devices said coil springs 102 will be compressed.

In the accomplishment of practical operation of the machine, the boring bar supporting units 11 and 12 will be set up on the frame 10 in spaced relation to each other a desired distance apart, at opposite sides of the clamping units, and fastened down on said frame in a manner forming no part of the present invention. The tubular element 60 of the holder 59 will be adjusted along the vertical slide column 56 to situate the supporting members or U-shape frames 61 at a selected elevation predetermined by the length of a connecting rod to be rebored, and said supporting member or U-shape frame will be rotatably adjusted, by employment of the vertical adjusting screw 72, to accurately set the part-cylindrical engaging surfaces 80, or 82, at their proper elevation. After rotatable adjustment of the supporting member or U-shape frame is accomplished, the head 79 of the clamping screw will be turned to cause said clamping screw to render the tubular element 60 and said supporting member or U-shape frame rigid the one with the other. One end of a connecting rod, either the wrist pin end or the crank shaft end, having a bearing to be bored, will be placed between the different spaced, parallel arms 68, 68 and the part-cylindrical engaging surfaces 80, 80 thereof, or the part-cylindrical engaging surfaces 82, 82 thereon, a locating rod or mandrel will be inserted through the end of the connecting rod, between said arms 68, 68, and rested in and upon said part-cylindrical engaging surfaces, and the retaining elements 92 will be fastened down against said locating rod or mandrel. The other end of said connecting rod, either the crank shaft end or the wrist pin end, will be placed between the supporting units 11 and 12 and a locating rod or mandrel will be inserted in and through the self-alining bearings 14, 15 and the end of the connecting rod between said supporting units. As disclosed, the wrist pin end of the connecting rod 88 is fitted upon the upper locating rod or mandrel 83 and the crank shaft end is between the supporting units 11 and 12. This is the set up when a crank shaft end is to be rebored. The crank shaft end is fitted upon the upper locating rod or mandrel and the wrist pin end is situated between the supporting units when a wrist pin end is to be rebored.

The clamping units will be actuated in a manner forming no part of this invention to cause oppositely disposed surfaces of the end of a connecting rod between the self-alining bearings 14, 15 to be grasped after the connecting rod has been fitted upon the upper and lower locating rods or mandrels.

The retaining elements 92 will be secured down against and released from and removed from upper locating rods or mandrels in response to manipulation of the locking devices 95 in the manner as hereinbefore set forth.

The lower locating rod or mandrel will be removed from the bearing of a connecting rod to be rebored after the connecting rod is set up in the machine, and a boring bar with appropriate cutting tool will be set up in the self-alining bearings of the supporting units 11 and 12 and actuated to accomplish a boring operation upon a bearing of said connecting rod, of course while the upper end of the connecting rod is supported upon the upper locating rod or mandrel and the lower end is clamped in the machine.

What is claimed is:

1. In a machine for centering and alining with respect to each other a connecting rod bearing to be rebored and a boring bar with appropriate tool for reboring said bearing, a frame, supporting units on said frame, and alined bearings on said supporting units, respectively, adapted selectively to removably receive a locating element or a boring bar for insertion through a bearing to be rebored of said connecting rod while situated between said supporting units, each of said bearings including a hollowed out cage having a longitudinally extending central passageway and radial slots disposed outwardly of and in contiguous relation to said central passageway, circumferentially spaced bearing elements in said radial slots having interiorly facing bearing surfaces of part-cylindrical configuration disposed longitudinally of said cage and means for adjusting said bearing elements interiorly and exteriorly of said cage, there being clearance openings between the bearing elements of each of said bearings extending longitudinally through the corresponding cage in contiguous relation to its central passageway.

2. In a machine for centering and alining with respect to each other a connecting rod bearing to be rebored and a boring bar with appropriate tool for reboring said bearing, a frame, supporting units on said frame, and alined bearings on said supporting units, respectively, adapted selectively to removably receive a locating rod or a boring bar for insertion through a bearing to be rebored of a connecting rod while situated between said supporting units, each of said bearings including a hollowed out cage having a longitudinally extending central passageway and radial slots disposed outwardly of and in contiguous relation to said central passageway each bounded at its exterior by a camming surface, circumferentially spaced bearing elements in said radial slots each bounded at its exterior side by a camming surface engaged against the camming surface at the exterior of a corresponding radial slot and an interiorly facing bearing surface of part-cylindrical configuration disposed longitudinally of said cage and means for adjusting said bearing elements longitudinally and interiorly and exteriorly of said cage, there being clearance openings between the bearing elements of each of said bearings extending longitudinally through the corresponding cage in contiguous relation to its central passageway.

3. In a machine for centering and alining with respect to each other a connecting rod bearing to be rebored and a boring bar with appropriate tool for reboring said bearing, a frame, a first supporting unit on said frame including portions for removably receiving a first locating element for insertion through a bearing of said connecting rod other than a bearing to be rebored, spaced second and third supporting units on said frame, and alined bearings on said second and third supporting units, respectively, adapted selectively to removably receive a second locating element or a boring bar for insertion through a bearing to be rebored of said connecting rod while situated between said second and third supporting units, each of said bearings including a hollowed out cage having a longitudinally extending central passageway and radial slots disposed outwardly of and in contiguous relation to said central passageway, circumferentially spaced bearing elements in said radial slots having interiorly facing bearing surfaces of part-cylindrical configuration disposed longitudinally of said cage and means for adjusting said bearing elements interiorly and exteriorly of said cage, there being clearance openings between the bearing elements of each of said bearings extending longitudinally through the corresponding cage in contiguous relation to its central passageway.

4. In a machine for centering and alining with respect to each other a connecting rod bearing to be rebored and a boring bar with appropriate tool for reboring said bearing, a frame, a first supporting unit on said frame including portions for removably receiving a first locating element for insertion through a bearing of said connecting rod other than a bearing to be rebored, spaced second and third supporting units on said frame, and alined bearings on said second and third supporting units, respectively, adapted selectively to removably receive a second locating element or a boring bar for insertion through a bearing to be bored of said connecting rod while situated between said second and third supporting units, each of said bearings including a hollowed out cage having a longitudinally extending central passageway and radial slots disposed outwardly of and in contiguous relation to said central passageway each bounded at its exterior by a camming surface, circumferentially spaced bearing elements in said radial slots each bounded at its exterior side by a camming surface engaged against the camming surface at the exterior of a corresponding radial slot and an interiorly facing bearing surface of part-cylindrical configuration disposed longitudinally of said cage and means for adjusting said bearing elements longitudinally and interiorly and exteriorly of said cage, there being clearance openings between the bearing elements of each of said bearings extending longitudinally through the corresponding cage in contiguous relation to its central passageway.

5. In a machine for centering and alining with respect to each other a connecting rod bearing to be rebored and a boring bar with appropriate tool for reboring said bearing, a frame, supporting units on said frame, and alined bearings on said supporting units, respectively, adapted selectively to removably receive a locating rod or a boring bar for insertion through a bearing to be rebored of said connecting rod while situated between said supporting units, each of said bearings comprising an annular member, an element rigid with said annular member providing an interiorly facing, arc shape bearing surface, a cage within said annular member having an exteriorly facing, arc shape bearing surface engaged with the arc shape bearing surface provided by said element, a retaining element supported by said annular member in spaced relation to said element providing an interiorly facing, arc shape bearing surface engaged with the arc shape bearing surface provided by said cage and spaced part-cylindrical bearing surfaces supported by an interior portion of said cage, there being clearance openings between the spaced part-cylindrical bearing surfaces of each of said bearings extending longitudinally through the corresponding cage in contiguous relation to a central passageway therethrough.

6. In a machine for centering and alining with respect to each other a connecting rod bearing to be rebored and a boring bar with appropriate tool for reboring said bearing, a frame, a first supporting unit on said frame including portions for removably receiving a first locating element for insertion through a bearing of said connecting rod other than a bearing to be rebored, spaced second and third supporting units on said frame, and alined bearings on said second and third supporting units, respectively, adapted selectively to removably receive a second locating element or a boring bar for insertion through a bearing to be rebored of said connecting rod while situated between said second and third supporting units, each of said bearings comprising an annular member, an element rigid with said annular member providing an interiorly facing, arc shape bearing surface, a cage within said annular member having an exteriorly facing, arc shape bearing surface engaged with the arc shape bearing surface provided by said element, a retaining element supported by said annular member in spaced relation to said element providing an interiorly facing, arc shape bearing surface engaged with the arc shape bearing surface provided by said cage and spaced part-cylindrical bearing surfaces supported by an interior portion of said cage, there being clearance openings between the spaced part-cylindrical bearing surfaces of each of said bearings extending longitudinally through the corresponding cage in contiguous relation to a central passageway thereof.

7. In a machine for centering and alining with respect to each other a connecting rod bearing to be rebored and a boring bar with appropriate tool for reboring said bearing, a frame, supporting units on said frame, and alined bearings on said supporting units, respectively, adapted selectively to removably receive a locating rod or a boring bar for insertion through a bearing to be rebored of said connecting rod while situated between said supporting units, each of said bearings comprising an annular member, elements rigid with said annular member providing spaced interiorly facing bearing surfaces of part-spherical configuration, a cage within said annular member having spaced exteriorly facing bearing surfaces of part-spherical configuration engaged with the bearing surfaces, respectively, of part-spherical configuration provided by said elements, a retaining element supported by said annular member in spaced relation to said elements providing spaced interiorly facing bearing surfaces of part-spherical configuration engaged with the bearing surfaces, respectively, of part-spherical configuration provided by said cage, and bearing elements rigid with interior portions of said cage providing circumferentially spaced, part-cylindrical bearing surfaces, there being clearance openings between and contiguous with the part-cylindrical bearing surfaces of each of said bearings extending longitudinally through the corresponding cage.

8. In a machine for centering and alining with respect to each other a connecting rod bearing to be rebored and a boring bar with appropriate tool for reboring said bearing, a frame, a first supporting unit on said frame including portions for removably receiving a first locating element for insertion through a bearing of said connecting rod other than a bearing to be rebored, spaced second and third supporting units on said frame, and alined bearings on said second and third supporting units, respectively, adapted selectively to removably receive a second locating element or a boring bar for insertion through a bearing to be rebored of said connecting rod while situated between said second and third supporting units, each of said bearings comprising an annular member, elements rigid with said annular member providing spaced interiorly facing bearing surfaces of part-spherical configuration, a cage within said annular member having spaced exteriorly facing bearing surfaces of part-spherical configuration engaged with the bearing surfaces, respectively, of part-spherical configuration provided by said elements, a retaining element supported by said annular member in spaced relation to said elements providing spaced interiorly facing bearing surfaces of part-spherical configuration engaged with the bearing surfaces, respectively, of part-spherical configuration provided by said cage, and bearing elements rigid with interior portions of said cage providing circumferentially spaced, part-cylindrical bearing surfaces, there being clearance openings between and contiguous with the part-cylindrical bearing surfaces of each of said bearings extending longitudinally through the corresponding cage.

9. In a machine for centering and alining with respect to each other a connecting rod bearing to be rebored and a boring bar with appropriate tool for reboring said bearing, a frame, supporting units on said frame, and alined bearings on said supporting units, respectively, adapted selectively to removably receive a locating element or a boring bar for insertion through a bearing to be rebored of said connecting rod while situated between said supporting units, each of said bearings comprising an annular member, elements rigid with said annular member providing interiorly facing bearing surfaces of part-spherical configuration lying in a single spherical surface and in a plane perpendicular to the longitudinal axis of said annular member and spaced apart circumferentially about the annular member, a cage within the annular member having exteriorly facing bearing surfaces of part-spherical configuration lying in a single spherical surface and in a plane perpendicular to the longitudinal axis of said cage and spaced apart circumferentially about the cage and engaged with the bearing surfaces, respectively, of part-spherical configuration provided by said elements, a retaining element supported by said annular member providing interiorly facing bearing surfaces of part-spherical configuration lying in a single spherical surface and in a plane perpendicular to the longitudinal axis of said retaining element and spaced apart circumferentially about the retaining element and engaged with the bearing surfaces, respectively, of part-spherical configuration provided by said cage in spaced relation to said bearing surfaces of part-spherical configuration provided by said elements and bearing elements rigid with interior portions of said cage providing spaced part-cylindrical bearing surfaces, there being clearance openings between and contiguous with the part-cylindrical bearing surfaces of each of said bearings extending longitudinally through the corresponding cage.

10. In a machine for centering and alining with respect to each other a connecting rod bearing to be rebored and a boring bar with appropriate tool for reboring said bearing, a frame, a first supporting unit on said frame including portions for removably receiving a first locating element for insertion through a bearing of said connecting rod other than a bearing to be rebored, spaced second and third supporting units on said frame, and alined bearings on said second and third supporting units, respectively, adapted selectively to removably receive a second locating element or a boring bar for insertion through a bearing to be rebored of said connecting rod while situated between said second and third supporting units, each of said bearings comprising an annular member, elements rigid with said annular member providing interiorly facing bearing surfaces of part-spherical configuration lying in a single spherical surface and in a plane perpendicular to the longitudinal axis of said annular member and spaced apart circumferentially about the annular member, a cage within the annular member having exterior facing bearing surfaces of part-spherical configuration lying in a single spherical surface and in a plane perpendicular to the longitudinal axis of said cage and spaced apart circumferentially about the cage and engaged with the bearing surfaces, respectively, of part-spherical configuration provided by said elements, a retaining element supported by said annular member providing interiorly facing bearing surfaces of part-spherical configuration lying in a single spherical surface and in a plane perpendicular to the longitudinal axis of said retaining element and spaced apart circumferentially about the retaining element and engaged with the bearing surfaces, respectively, of part-spherical configuration provided by said cage in spaced relation to said bearing surfaces of part-spherical configuration provided by said elements, and bearing elements rigid with interior portions of said cage providing spaced part-cylindrical bearing surfaces, there being clearance openings between and contiguous with the part-cylindrical bearing surfaces of each of said bearings extending longitudinally through the corresponding cage.

11. In a machine for centering and alining with respect to each other a connecting rod bearing to be rebored and a boring bar with appropriate tool for reboring said bearing, a frame, a vertical slide column rigid therewith, a tubular element adjustable longitudinally of said slide column, means for securing said tubular element in fixed relation to said slide column, a supporting member pivotally mounted upon said tubular element for adjustable swinging movement in a vertical plane, a device for securing said supporting member in fixed relation to said tubular element, a seat upon said supporting member in spaced relation to said slide column for removably receiving a locating element for insertion through a bearing of said connecting rod other than a bearing to be rebored, and a retainer upon said supporting member adapted to be releasably engaged with a surface of a locating element upon said seat opposite a surface engaged against the seat.

12. In a machine for centering and alining with respect to each other a connecting rod bearing to be rebored and a boring bar with appropriate tool for reboring said bearing, a frame, a vertical slide column rigid therewith, a tubular element adjustable longitudinally of said slide column, means for securing said tubular element in fixed relation to said slide column, a supporting member constituted as a U-shape frame including spaced, parallel arms at opposite sides of said tubular element pivotally mounted thereon for adjustable swinging movement in a vertical plane and a base element between said parallel arms in spaced relation to the tubular element, a device for securing said supporting member in fixed relation to said tubular element, alined part-cylindrical seats upon said parallel arms in spaced relation to the tubular element opposite said base element for removably receiving a locating element for insertion through a bearing of said connecting rod other than a bearing to be rebored, and retainers upon said supporting member adapted to be releasably, removably engaged with surfaces of a locating element upon said part-cylindrical seats opposite surfaces engaged against the part-cylindrical seats.

13. In a machine of the character described, a first member providing a relatively large part-cylindrical seat for removably receiving a relatively large locating element, a second member providing a comparatively smaller part-cylindrical seat for removably receiving a comparatively smaller locating element and a part-cylindrical seating surface opposite said comparatively smaller part-cylindrical seat for engagement against said relatively large part-cylindrical seat provided by said first member, means for detachably securing said second member upon said first member with said part-cylindrical seating surface provided by the second member and the relatively large part-cylindrical surface provided by the first member in engagement and said comparatively smaller part-cylindrical seat at the inner side of said relatively large part-cylindrical seat, and a retainer upon said first member adapted selectively to be releasably engaged with either a surface of said relatively large locating element when upon said relatively large part-cylindrical seat opposite a surface engaged against the relatively large part-cylindrical seat or a surface of said comparatively smaller locating element when upon said comparatively smaller part-cylindrical seat opposite a surface engaged against the comparatively smaller part-cylindrical seat.

14. In a machine of the character described, first members providing alined relatively large part-cylindrical seats for removably receiving a relatively large locating element, second members providing alined comparatively smaller part-cylindrical seats for removably receiving a comparatively smaller locating element and part-cylindrical seating surfaces opposite said comparatively smaller part-cylindrical seats for engagement against said relatively large part-cylindrical seats, respectively, provided by said first members, means for detachably securing said second members upon said first members with said part-cylindrical seating surfaces provided by the second member and the relatively large part-cylindrical seats provided by the first member in engagement and said comparatively smaller part-cylindrical seats at the inner sides of said relatively large part-cylindrical seats, respectively, and retainers upon said first members adapted selectively to be releasably, removably engaged with either surfaces of said relatively large locating element when upon said relatively large part-cylindrical seats opposite surfaces engaged against the relatively large part-cylindrical seats or surfaces of said comparatively smaller locating element when upon said comparatively smaller part-cylindrical seats opposite surfaces engaged against the comparatively smaller part-cylindrical seats.

15. In a machine of the character described, a first member providing a relatively large part-cylindrical seat for removably receiving a relatively large cylindrical element, a second member providing a comparatively smaller part-cylindrical seat for removably receiving a comparatively smaller cylindrical element, a retainer upon said first member adapted selectively to removably engage either a surface of said relatively large cylindrical element when upon said relatively large part-cylindrical seat opposite a surface engaged against the relatively large part-cylindrical seat or a surface of said comparatively smaller cylindrical element when upon said comparatively smaller part-cylindrical seat opposite a surface engaged against the comparatively smaller part-cylindrical seat, and means for releasably locking said retainer in engaged relation with either said relatively large or said comparatively smaller cylindrical element.

16. The combination as specified in claim 15 wherein said second member is mounted upon said first member for movement of rotation of said retainer toward and away from said relatively large and comparatively smaller part-cylindrical seats.

EWALD A. ARP.

REFERENCES CITED

The following references are of record in the file of this patent:

UNITED STATES PATENTS

| Number | Name | Date |
| --- | --- | --- |
| 258,000 | Balsbaugh | May 16, 1882 |
| 1,451,585 | Marquis | Apr. 10, 1923 |
| 1,492,062 | Baker | Apr. 29, 1924 |
| 1,523,310 | Sundstrand | Jan. 13, 1925 |
| 2,056,671 | Hennings | Oct. 6, 1936 |